United States Patent [19]

Wiedemann et al.

[11] Patent Number: 5,347,293
[45] Date of Patent: Sep. 13, 1994

[54] DISPLAY DEVICE FOR MOTOR VEHICLES

[75] Inventors: Werner Wiedemann, Herzogenaurach; Walter Ereth, Stein, both of Fed. Rep. of Germany

[73] Assignee: Robert Bosch GmbH, Stuttgart, Fed. Rep. of Germany

[21] Appl. No.: 663,919

[22] PCT Filed: Jun. 24, 1989

[86] PCT No.: PCT/DE89/00420
  § 371 Date: Mar. 11, 1991
  § 102(e) Date: Mar. 11, 1991

[87] PCT Pub. No.: WO90/03024
  PCT Pub. Date: Mar. 22, 1990

[30] Foreign Application Priority Data

Sep. 9, 1988 [DE] Fed. Rep. of Germany ....... 3830695

[51] Int. Cl.$^5$ .............................................. G09G 3/36
[52] U.S. Cl. ........................................ 345/87; 345/147
[58] Field of Search ............... 340/784, 784 G, 765, 340/793; 359/48, 54; 345/87, 89, 147, 84, 63, 38, 50, 102, 55

[56] References Cited

U.S. PATENT DOCUMENTS

| | | | |
|---|---|---|---|
| 4,104,627 | 8/1978 | Thuler | 340/765 |
| 4,838,661 | 6/1989 | McKee et al. | 359/48 |
| 4,865,425 | 9/1989 | Kobayashi et al. | 359/48 |
| 4,965,574 | 10/1990 | Fukushima et al. | 340/793 |

FOREIGN PATENT DOCUMENTS 0115575  8/1984  European Pat. Off. .

OTHER PUBLICATIONS

Automotive Engineering, "West Germany", Jan., 1986, pp. 32–39.
Patent Abstracts of Japan, vol. 9, No. 18 (M-353).

*Primary Examiner*—Ulysses Weldon
*Assistant Examiner*—Doon Chow
*Attorney, Agent, or Firm*—Frishauf, Holtz, Goodman & Woodward

[57] ABSTRACT

A display device (16) for motor vehicles features a graphic-capable and back-lighted transflective dot matrix LCD (19) the matrix dots of which can be activated electrically by way of driver stages, whereby they represent information (29) on the LCD by contrast in brightness between activated matrix dots (22) which have voltage applied to them and the other non-activated matrix dots. In order to obtain as contrasting as possible but dazzle-free information display in bright and in dark conditions, a contrast switch-over is effected on the LCD (19) in that the driver stages of the activated and the non-activated matrix dots can be switched over in dependence on the brightness in front of the LCD (19).

5 Claims, 1 Drawing Sheet

DISPLAY DEVICE FOR MOTOR VEHICLES

FIELD OF THE INVENTION

The present invention relates generally to display devices for motor vehicles and, more particularly, to a Liquid Crystal Display (LCD) for vehicular use in which either positive or negative contrast is used, depending upon ambient lighting conditions.

In known LCD display devices, the legibility of the display at different degrees of brightness in the surroundings in front of the display is kept as constant as possible, in that the brightness of the surroundings is measured by a photo-electric detector, and the illumination of the display device is made to follow by means of suitably dosed direct or indirect lighting of the display (EP-A3-011 55 75, Ziegler and Knoll, assigned to the assignee of the present invention). It is also known that the brightness of the display can additionally be controlled in dependence on the brightness in front of the vehicle in order thus to take into account the state of adaptation of the driver's eyes, which is mainly determined by the brightness in the driver's field of vision. The legibility of the displays however also depends on whether the information to be displayed is represented in positive contrast or in negative contrast. This applies particularly for graphic-capable transflective dot matrix LCDs, on which information can be represented in the form of different symbols, figures, or numerical values and/or letters or words. In the case of a display in positive contrast where dark symbols appear on a bright background, the legibility is good in daylight, while at night, due to the back-lighting of the LCD, the eye must first adjust to the bright surroundings, which extends the reading period. With bright back lighting, there is the danger of dazzling the driver, and with weak back lighting, the legibility is reduced by too little contrast. In the case of negative contrast, i.e. with bright symbols on a dark background, the display is easily legible in the dark, as here the eye need not adapt to the background brightness. However, in that case there is poor legibility in daylight, as shadows are formed by the illumination on the background of the display, which shadows limit the symbols to be shown. There occurs a so-called dazzle effect of the liquid crystal display.

In the present solution of the problem, the effort is made to optimize the contrast of the display for graphic-capable transflective dot matrix LCDs as far as possible in dependence respectively on the light conditions in the vehicle or in front of and behind the vehicle as the case may be.

The Invention

The display device according to the invention has the advantage that, due to the contrast switch-over on the one hand a high contrast of the display can be achieved during the day, in that when illuminated, the symbols appear dark on a light background, and in that on the other hand conversely in darkness the surroundings of the symbols are dark, so that the eye does not have to adapt to bright surroundings. Due to this solution, the legibility of the display is no longer adversely affected by light conditions outside or by back-lighting. It is to be regarded as a further advantage that the contrast switch-over is also independent of whether the LCD was made for positive or negative contrast. One can simply invert the activation of the individual matrix dots of the LCD without altering the LCD, and thereby obtain a contrast switch-over. In the case of an LCD produced with positive contrast, the non-activated matrix dots are bright, i.e. translucent and become dark by the contrast switch-over by applying a voltage, i.e. they are switched to block, whereas LCDs produced with negative contrast are dark when the matrix dots are not activated, and in the case of contrast switch-over are switched to be bright by applying a voltage. In this solution it is further advantageous that the necessary light power for the back-lighting of the transflective dot matrix LCDs can be reduced.

The invention features a particularly effective and hence advantageous contrast switch-over for the LCD, where a light sensor measures the light density of the light falling on the LCD from the observation area and controls the contrast switch-over of the LCD in dependence thereon. The electrical signal of the light sensor is usefully transmitted to a threshold switch, which with bright surroundings in front of the LCD switches the information display to positive contrast and with dark surroundings switches it to negative contrast, The threshold switch can advantageously have an adjustable switching threshold, which is to be individually adjusted by the driver.

As, depending on the size of the dot matrix or the information to be displayed, the greater part of the matrix dots are either used to represent the information or to form the surroundings of the information, it is advantageous if, regardless of the size and shape of the information displayed on the LCD, the greater part of the matrix dots are activated so as to be bright for bright surroundings in front of the LCD, and the smaller part so as to be dark. Conversely, due to the contrast switch-over, with dark surroundings the greater part of the matrix dots is activated so as to be dark and the smaller part so as to be bright.

DRAWING

Embodiments of the invention are shown in the drawing and are explained in greater detail in the following description. FIG. 1 shows a section of the vehicle with a display device built into the dashboard, and a contrast switch-over depending on the brightness. FIG. 2 shows a section of the display device according to FIG. 1 with a dot matrix LCD and FIG. 3 shows sections of the dot matrix LCD with a) and b) in positive contrast and c) and d) in negative contrast.

DETAILED DESCRIPTION OF THE PREFERRED EMBODIMENT

Figure 1:
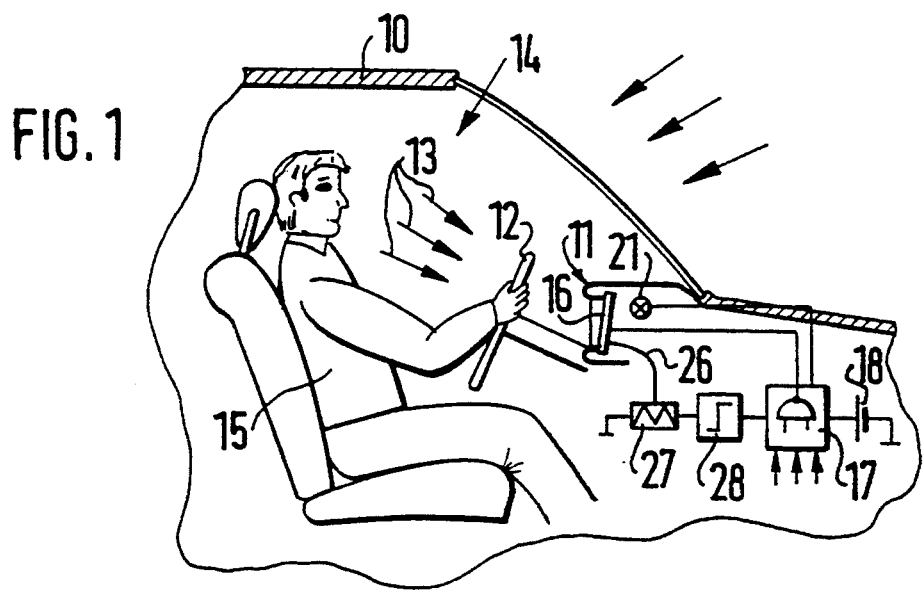

FIG. 1 shows a sectional schematic representation of the driver area of a motor vehicle 10 with a dashboard 11, which is situated behind or immediately next to the steering wheel 12 of the motor vehicle 10. Therein light from the observation area 14 of a driver 15 falls onto the display 16 of dashboard 11 in the direction of the arrow 13. In the embodiment, the display consists of a transflective liquid crystal display (LCD). The display 16 is at the same time connected to an electrical control circuit 17 which is supplied by an accumulator battery 18 of the motor vehicle 10. Measured data are transmitted to the control circuit 17 from various sensors in the motor vehicle which are not shown, and which are used to activate the corresponding display elements on the LCD.

Figure 2:
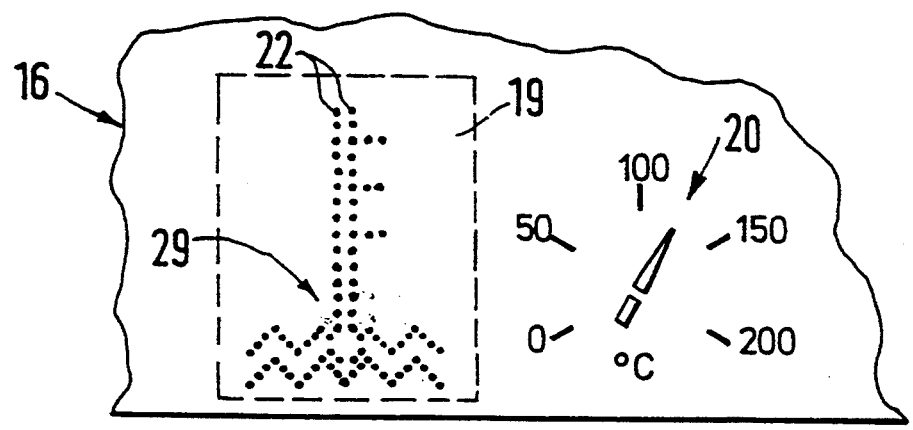
Figure 3A:
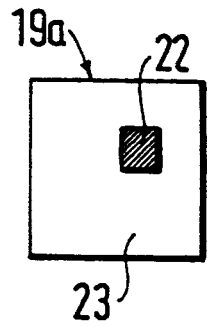
Figure 3B:
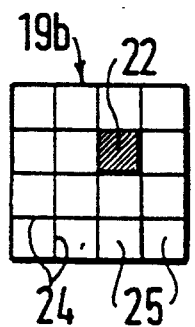
Figure 3C:
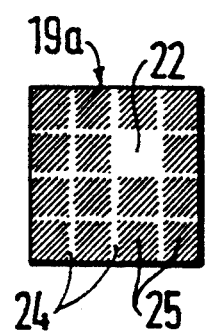
Figure 3D:
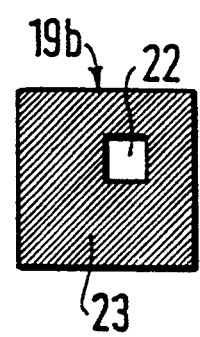

FIG. 2 shows a section of the display device 16 with a transflective dot matrix LCD 19 in the dotted area next to various other dial displays 20. The dot matrix 19 consists of a multiplicity of picture elements, the so-called pixels, which are arranged in rows and columns and which can be individually activated by driver stages which are not shown. The electrical driver stages are at the same time included in the control circuit 17 or arranged separately therefrom on the LCD. Depending on the construction of the dot matrix LCD 19, the light is allowed through or is blocked in the picture elements which have voltage applied to them. The blocked areas of the dot matrix 19 then appear dark, as neither is the light falling on these areas from outside reflected there, nor is the light from a light source 21 shown in FIG. 1 and arranged behind the dot matrix LCD 19 allowed to reach the outside in these areas. In the translucent areas of the dot matrix 19, on the other hand, light coming in from outside is for the most part reflected by a transflector situated behind the LCD or the light behind the LCD is allowed through to the front. In this way there appears the information 29 consisting of the picture elements 22.

In FIG. 3 the contrast pictures of the dot matrix LCD 19 which are thereby possible are shown. FIG. 3a shows one picture element 22, which is intended to show one piece of information in positive contrast, i.e. the picture element 22 appears dark against the bright background 23. The dot matrix LCD used in this case is so constructed that the light is blocked in the activated areas, i.e. those with voltage applied to them. In FIG. 3b on the other hand the light is conversely blocked in the non-activated areas, i.e. in this case in picture element 22, while it is allowed to pass through in the activated areas. In this dot matrix, which is designed for negative contrast display, dark lines 24 therefore appear between the activated picture elements 25 in positive contrast, in accordance with FIG. 3b. By switching over from positive contrast of the display in accordance with FIGS. 3a and 3b, to negative contrast in accordance with FIGS. 3c and 3d, information representing picture element 22 appears on the other hand bright on a dark background 23. In accordance with FIG. 3c picture element 22 in the area of 19a of dot matrix 19 is now not activated, while the other picture elements 25 are activated, so that bright vertical and horizontal lines 24 become visible between them. In accordance with FIG. 3d, on the other hand, the area 19b of an LCD designed for negative contrast, is only activated in respect of picture element 22 and hence translucent.

In order to be able to detect the information appearing on the dot matrix LCD 19 as quickly as possible, the contrast of the emitted information on its background must on the one hand be as good as possible, and on the other hand the driver must at the same time not be dazzled. For this purpose it is provided in accordance with FIG. 1 that the light density of the light 13 falling on the display device 16 from the observation area 14 in motor vehicle 10 is detected by a light sensor 27 via an optical fiber 26, and is converted into an electrical signal in order to change over the driver stages of the respectively activated and non-activated matrix dots 22 and 23 for the purpose of effecting the contrast switch-over of the dot matrix LCD 10 in dependence on the brightness in front of the LCD. For this purpose, in the embodiment in accordance with FIG. 1, the light sensor 27 is a photo-electric cell, which is connected to the input of a threshold switch 28 and whose signal intervenes in the control circuit 17 in such a manner that the control signals for the individual picture elements of dot matrix LCD 19 are inverted. The threshold switch 28 can be made as a Schmitt trigger with switching hysteresis. In the case of bright surroundings in front of the LCD, this switches the displayed information over to positive contrast in accordance with FIGS. 3a and 3b and in the case of dark surroundings to negative contrast in accordance with FIGS. 3c and 3d. Due to the illumination from the observation space 14 in vehicle 10 a good contrast is thereby obtained during the day by the dark symbols 22 on the bright background 23 and at night by the bright symbols 22 on the dark background 23 due to the illumination from the light source 21 behind the dot matrix 19 to be switched on simultaneously with the switch-over signal to give an easily legible display without the danger of dazzle, since the eye does not have to adapt to a dark background.

Depending on the size and shape of the information to be indicated on the LCD, more or fewer matrix dots 22 are required for this, Thus in the case of relatively large information displays, the contrast can then not be adversely affected by an insufficiently large background, and at night there can thereby arise a danger of dazzle by a bright, relatively large information display. In order to take this into account also when switching over the contrast on the dot matrix LCD 19, it is possible to compare the number of bright activated and dark activated matrix dots for each information display. Regardless of the size and shape of the information displayed on the LCD, in the case of bright surroundings in front of the LCD 19 the greater part of the matrix dots can thereby be activated to be bright, while the smaller part is activated to be dark. Conversely, in the case of dark surroundings, the greater part of the matrix dots is activated to be dark to avoid the danger of dazzle and the smaller part is activated to be bright. The threshold value depending on the brightness at which the automatic contrast switch-over takes place, can be set by the manufacturer according to where the display device is fitted or depending on the number, size and shape of the vehicle's windows, or it can be set individually, e.g. by hand by means of a potentiometer in the area of the display according to the driver's requirements.

We claim:

1. Display device for displaying a succession of images in a motor vehicle, comprising
   a graphic-capable transflective dot matrix LCD (19);
   means (21) for backlighting said LCD, and
   a Liquid Crystal Display (LCD) control circuit (17), having an output connected to and controlling said LCD, said control circuit including
   driver stages electrically activating matrix dots or pixels (22,25) of said LCD,
   memory means in said control circuit for representing information as one of said images on said LCD by brightness contrast including instructions to said drivers for applying a voltage to certain activated matrix dots, as opposed to the remaining non-activated matrix dots, to which no voltage is applied,
   means in said control circuit for comparing, in each successive image to be displayed on said LCD, the number of activated matrix dots or pixels to the number of non-activated matrix dots or pixels, in order to use the result of this comparison as a factor in automatic selection of a contrast mode, and
   means (27) for selectively setting said display, under conditions of bright ambient lighting, to a positive contrast mode in which a majority of pixels in said image are bright, thereby assuring adequate legibility of said information, and under conditions of dim ambient lighting, to a negative contrast mode in which a majority of pixels in said image are dark, thereby preventing dazzling of a vehicle operator.

2. Display device in accordance with claim 1, further comprising a light sensor (27), having an output connected to an input of said display control circuit (17), which measures the light density of light (13) falling on the LCD (19) from outside and, in dependence thereon, controls switching over of the contrast of the LCD (19) from one of said modes to the other mode.

3. Display device in accordance with claim 1, further comprising a light-dependent threshold switch (28), having an output connected to an input of said display control circuit (17), which switches the information display to positive contrast in the case of bright surroundings in front of the LCD (19) and to negative contrast in case of dark surroundings.

4. Display device according to claim 1, wherein switchover from said positive contrast mode to said negative contrast mode occurs automatically when ambient light level sensed by a sensor (27, 28) drops below a predetermined threshold.

5. Display device according to claim 1, wherein switchover between said positive contrast mode and said negative contrast mode is controlled manually by a vehicle operator.

* * * * *